United States Patent [19]

Voinescu et al.

[11] 4,153,997
[45] May 15, 1979

[54] SHOCK ABSORBING DEVICE FOR USE IN DIAL MEASURING INSTRUMENTS

[75] Inventors: Nicolae Voinescu, Lausanne; Serge Ginggen, Chavannes, both of Switzerland

[73] Assignee: TESA S.A., Renens, Switzerland

[21] Appl. No.: 881,624

[22] Filed: Feb. 27, 1978

[30] Foreign Application Priority Data

Mar. 1, 1977 [CH] Switzerland ............... 2533/77

[51] Int. Cl.² .................................................. G01B 5/00
[52] U.S. Cl. ................................. 33/147 J; 33/DIG. 6
[58] Field of Search ............ 33/172 R, 147 R, 147 T, 33/147 J, DIG. 6; 116/129 R

[56] References Cited

U.S. PATENT DOCUMENTS

| | | | |
|---|---|---|---|
| 2,117,268 | 5/1938 | Ames | 33/172 R |
| 2,336,695 | 12/1943 | Maurer | 33/DIG. 6 |
| 3,835,544 | 9/1974 | Schneider | 33/DIG. 6 |
| 4,010,548 | 3/1977 | Iwasaki | 33/172 R |

FOREIGN PATENT DOCUMENTS 1095004 12/1954 France ......................... 33/172 R Primary Examiner—Harry N. Haroian
Attorney, Agent, or Firm—Anthony J. Casella

[57] ABSTRACT

A shock absorbing device for use in dial measuring instruments comprising a balance lever interposed between a pinion and a coaxial toothed wheel of the multiplier mechanism disposed between the movable indicator member and the movable feeler of the instrument, said balance lever being pivoted on the common axis of said pinion and toothed wheel and intercepting during its pivotal movement in one and the same direction a first radial driving finger integral with an arm connected to the pinion and a second radial driving finger integral with said toothed wheel, a resilient liaison being formed between the balance lever and the radial driving fingers by the opposed action of the ends of at least a spiral spring connected at its inner end to said balance lever.

7 Claims, 7 Drawing Figures

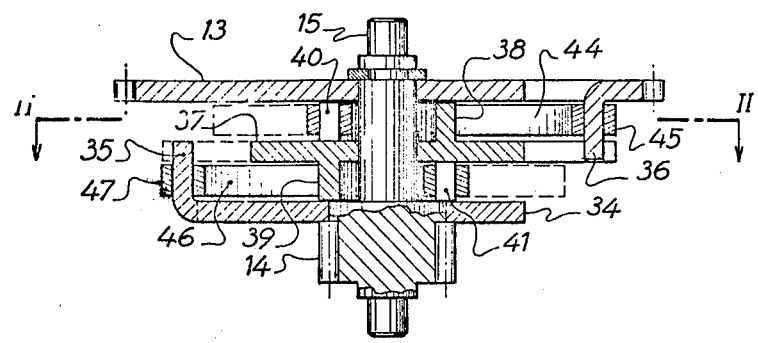
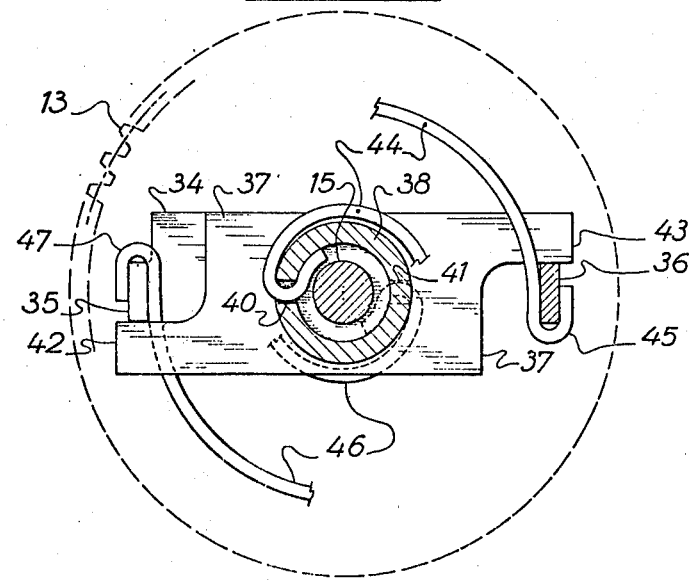

SHOCK ABSORBING DEVICE FOR USE IN DIAL MEASURING INSTRUMENTS

The present invention relates to a shock-absorbing device for measuring instruments incorporating dials, such as comparators, gauges, columns and marking gauges used in precision engineering. The device includes a spiral spring damping system inserted between a pinion and a toothed wheel coaxial therewith of a multiplier transmission mechanism disposed between a movable indicator member and a movable feeler of such a measuring instrument.

Shock-absorbing devices of this general type are known which, because the spiral spring system has a long, angular damping path to prevent breakages in the gearing of the multiplier mechanisms when the feeler arrives suddenly at the end of the path or is violently displaced by other shocks.

However, such devices suffer from the disadvantage of only being able to ensure the damping of shocks transmitted in a single direction of rotation of the wheel and the pinion. This is because the angular connection of these two members is effected by providing at least two mutual radial driving fingers which are biassed into abutment with one another by the spiral spring. These fingers can only move apart when the single finger of the pinion transmitting the shock is spaced from the finger of the toothed wheel, and cannot do so when these two fingers are in abutment.

Double-acting shock-absorbing devices are known which dampen shocks transmitted in both directions of rotation of the wheel and pinion. However, such devices employ leaf or springs angularly disposed in opposed pairs at 180° to one another, each acting in an opposite direction to the other. Such a device occupies a large angular space which only leaves a small damping path, of the order of a few degrees, between them. It is, therefore, virtually impossible for such a device to absorb violent shocks without causing damage to the toothing of the pinions and multiplier mechanism wheels of the instruments in which they are incorporated.

According to the present invention, there is provided a shock-absorbing device for use in dial measuring instruments having a pinion and a toothed wheel coaxial therewith forming part of a transmission multiplier mechanism, the shock-absorbing device being interposed therebetween by a rack and pinion mechanism disposed between a movable indicator member and a movable feeler of the instrument, the device comprising a balance lever interposed between the pinion and the toothed wheel, the lever being pivotally mounted on the common pivotal axis of the pinion and toothed wheel and intercepting, during pivotal movement in a single direction, a first radial driving finger integral with an arm rigidly connected to the pinion and a second radial driving finger integral with the toothed wheel, a resilient connection being formed between the balance lever and the two fingers by the opposed action of the ends of at least one spiral spring connected at its inner end to the balance lever.

The invention will be further described, by way of example, with reference to the accompanying drawings, in which:

FIG. 6 is an axial section, on an enlarged scale relative to FIG. 1, a further embodiment of a shock-absorbent device.

FIG. 7 is a sectional view taken along the line II—II of FIG. 6.

Figure 1:
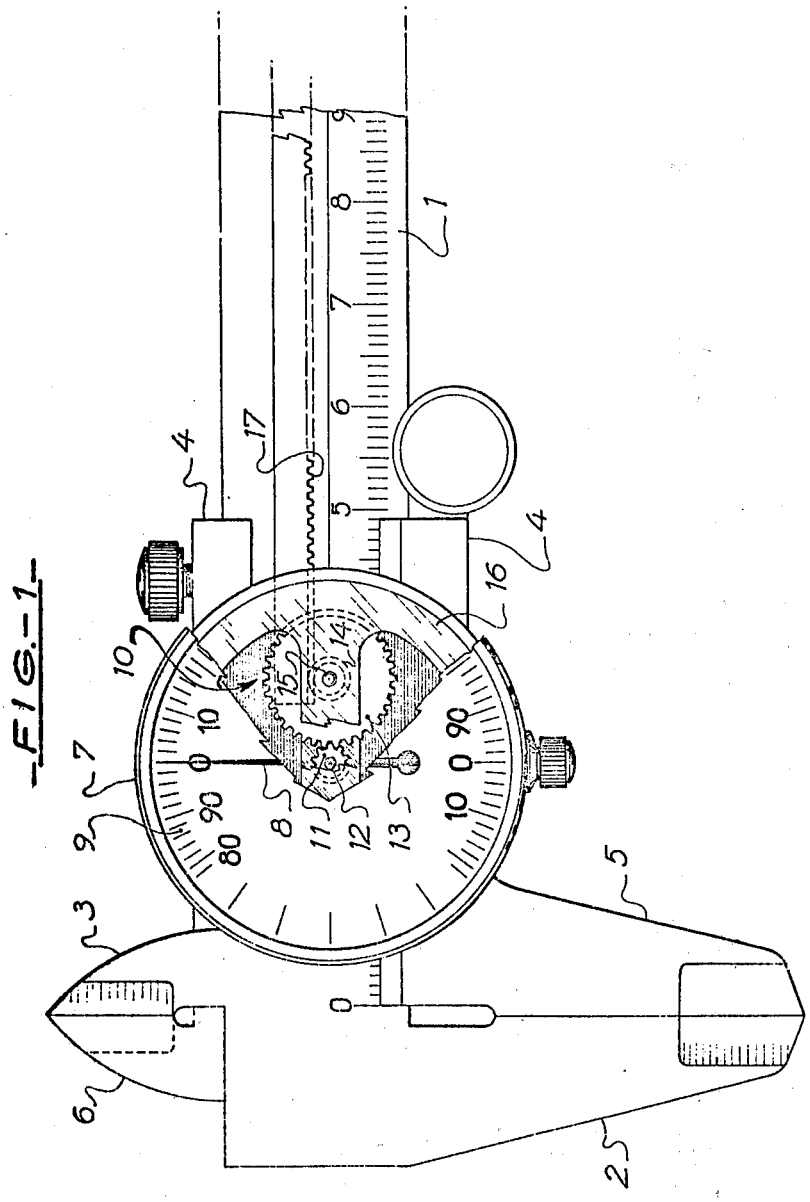
FIG. 1 is an elevational view, partially in section, of a measuring device having a dial, the device incorporating a shock-absorbent device in accordance with the present invention.

In FIG. 1, there is shown a measuring gauge including a dial. The gauge comprises a body portion 1 in the form of a graduated rule carrying at one of its ends conventional fixed internal and external feelers in the form of jaws 2 and 3. A movable slider or cursor 4 is displaceable along the body portion 1 which likewise carries conventional displaceable external and internal feelers 5 and 6 located in opposed relationship to the fixed feelers 2 and 3. The casing of an indicator dial members is mounted on the movable slider 4. The indicator dial member comprises an indicator member or pointer 8 rotatably mounted with respect to a graduated scale 9.

Angular displacements of the pointer 8 occur when linear displacement of the movable slider 4 takes place. Such angular displacement is produced by a transmission multiplier mechanism 10 which amplifies the linear displacement so as to permit the reading, on the graduated scale 9, of sub-divisions of the graduations on the body portions 1.

This transmission multiplier mechanism 10 comprises a pinion 11 which is co-axially mounted at 12 with the pointer 8 and rotates the pointer. The pinion 11 meshes with a toothed wheel 13, which latter is coaxially mounted with a pinion 14 on an axle 15. The mechanism is maintained between plates 16 mounted on the casing 7 for the dial. The pinion 14 meshes with a rack 17 fixedly mounted on the body portion 1 of the instrument.

The toothed wheel 13, which is freely rotatably mounted on the axle 15, is driven by the pinion 14 coaxial therewith through the intermediary of a shock-absorbent damping device incorporating spiral springs, which device is located between them and is not visible in FIG. 1. This device limits the transmitted driving force to below a predetermined value which, in practice, corresponds substantially to the maximum force which can be resisted by the toothing of the gears of the transmission multiplier mechanism, with a safety margin irrespective of the direction of displacement of the movable feelers 5 and 6 of the slider 4.

A first embodiment of this shock-absorbing device is shown in FIGS. 2 to 5.

Figure 2:
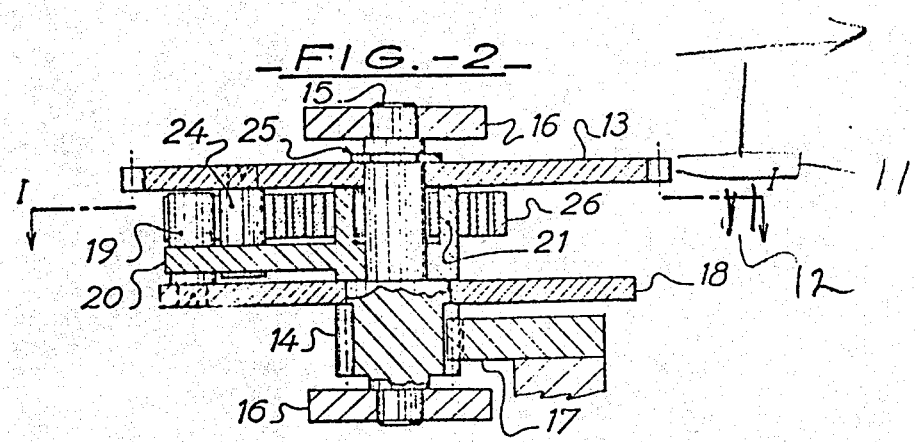
FIG. 2 is an axial section, on an enlarged scale relative to FIG. 1, through a first embodiment of a shock-absorbent device of the present invention.

In the axial section shown in FIG. 2, there can be seen the pinion 14 in mesh with the rack 17 and the toothed wheel 13. The common axle 15 rotates in two opposed bearings provided on the two plates 16.

The axle 15 is, in this embodiment, integral with the pinion 14, and has an arm 18 fixed thereon. At one of its ends, this arm carries a radial driving finger 19 which, in this embodiment, is in the form of a cylinder, the base of which is located in a recess formed in the arm 18.

A balance lever or tipping means 20 is freely rotatably mounted on the axle 15 above the arm 18. This balance lever 20 carries in its central region, a hollow cylindrical hub 21 which has a slot 22, visible in FIGS. 3 to 5, formed in its lateral walls. The lever 20 terminates, in a radial direction, in a plane bearing member 23 which is capable of intercepting the driving finger 19 as well as a second driving finger 24 integral with the toothed wheel 13. This second finger 24 is similar to the finger 19 and is affixed on the toothed wheel 13 in a similar manner as the finger 19 on the arm 18. These two driving fingers 19 and 24 are radially offset from one another so that they can be intercepted side by side by the bearing member 23 of the balance lever 20. The toothed wheel 13 freely rotates about the axle 15 and is retained in position between the upper face of the hub 21 of the balance lever 20 and a securing washer 25 fixedly located in a groove formed in the axle 15.

In the free space between the balance lever 20 and the toothed wheel 13, a spiral spring 26 is located, one end 27 (FIG. 3) of which is connected to the balance lever 20 by a folded portion which engages in the slot 22 formed in the hub 21 of the balance lever 20.

The other end 28 of this spiral spring 26, which spring has desired physical characteristics in dependence upon the use to which it is to be put, is also folded and bears against the driving fingers 19 and 24 so that these two fingers are biassed against the bearing member 23 of the balance lever 20.

The shock-absorbing device described above functions in the following manner. When the slider 4 (FIG. 1) is longitudinally displaced along the body portion 1 of the instrument, the pinion 14, which meshes with the rack 17, rotates and entrains the arm 18 (FIGS. 2 and 3) to which it is rigidly connected.

The arm 18, through the intermediary of the driving finger 19, transmits its rotational movement to the driving finger 24 of the toothed wheel 13, because of the bearing of these two fingers against the bearing member 23 of the balance lever 20 caused by pressure of the spiral spring 26. In turn, the toothed wheel 13, driven by its finger 24, transmits its rotational movement to the pinion 11 with which it is in mesh and hence to the pointer 8.

When the slider 4 is subjected to a rapid acceleration or deceleration, the arm 18, driven by the pinion 14, in transmitting these forces through the intermediary of the described shock-absorbing device, turns to the assembly constituted by the pointer 8, the pinion 11 and the toothed wheel 13 which oppose these violent forces with much greater resistance, especially since its inertia is considerably increased, dynamically by the strong multiplication of the transmission mechanism.

Figure 3:
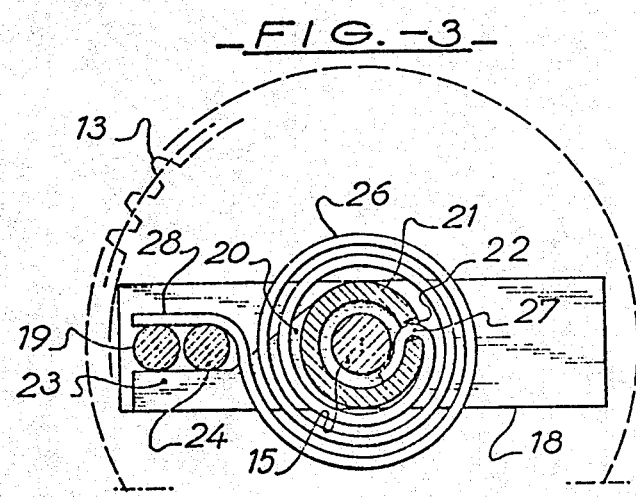
FIG. 3 is a sectional view taken along the line I—I of FIG. 2, certain parts having been omitted for the sake of clarity.

Because of this resistance, the single finger 24 of the toothed wheel 13 tends to remain immobile, whilst the finger 19, which is integral with the pinion 14 transmitting the force is angularly displaced with respect to the finger 24 so as to compress the spiral spring 26. If the force acts in a clockwise direction as shown in FIG. 3, the compression of the spring is caused by pressure on the end 28 thereof whilst if the force acts in an anticlockwise direction, the pressure acts on the end 27 of the spring due to the presence of the lever 20.

The spiral spring 26 is thus compressed and absorbs a large proportion of the force before transmitting any movement to the driving finger 24 of the toothed wheel 13. Such force absorbtion can take place over a long angular damping path of substantially 360°. This most unfavourable, and improbable, case, only occurs if the finger 24 remains immobile during the entire duration of the acceleration or deceleration, because of the inertia of the assembly. After the damping action, the spiral spring 26 resumes its position causing, in its slackening movement, the angular approach, followed by immobilisation, of the two driving fingers 19 and 24 against the bearing member 23 of the balance lever 20.

Except during those periods in which the angular connection of the pinion 14 and of the toothed wheel 13 is unsettled, the quality of the indexing of this angular connection depends on the orientation of the end 28 of the spiral spring 26 because this must in turn, cause the two driving fingers 19 and 24 to bear on the bearing member 23 of the balance lever 20. To this end, the fold at this end of the spiral spring may be made more acute since the resilience of this end of the spring and the force of the spring must also be taken into account By so doing, the double contact is ensured when the spring is tensioned.

Figure 4:
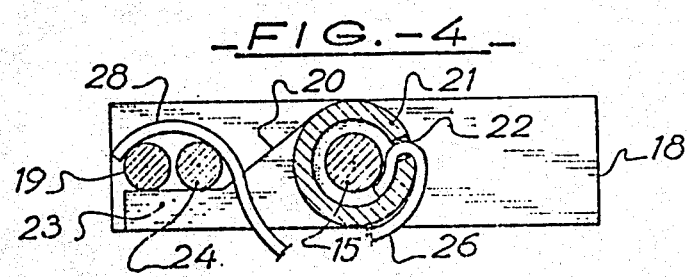
FIGS. 4 and 5 are views similar to that shown in FIG. 3 of further embodiments of a shock-absorbent device in accordance with the present invention.

A simple arrangement which automatically ensures a substantially equal distribution of the pressure on the two driving fingers 19 and 24 by the end 28 of the spring is shown in FIG. 4. In this arrangement, the end 28 has a re-entrant bend in the shape of an arc of a circle, the incurved inner face of which grips the two fingers. When the spring is tensioned, the end 28 thereof automatically bears against the two fingers 19 and 24 in the same relative position of its zones of contact with the said fingers, irrespective of the angular position of the end 28.

Figure 5:
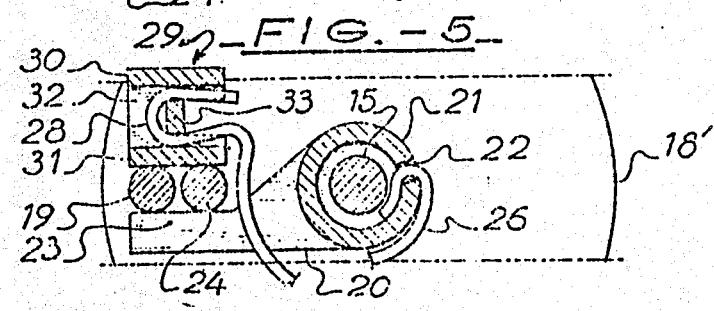

The arrangement shown in FIG. 5 also ensures automatic contact of the spring with the two fingers 19 and 24. In this arrangement, the outer end 28 of the spiral spring 26 bears indirectly on the two driving fingers 19 and 24 through the intermediary distributing rocker bar 29 pivotally mounted on the end 28 of the spring. The rocker bar 29 has a substantially U-shaped profile, the two legs of which are designated 30 and 31. In the base 32 of the profile a retaining tongue is formed by slitting and folding upwardly. The end 28 of the spiral spring 26 is located between the legs 30 and 31 and around the tongue 33 of this rocker bar 29. The ends of the arms of the U are slightly pinched together to permit the rocker bar 29 to be angularly offset around the retaining tongue 33 to retain it in place. The arm 18 is integral with the pinion 14 and is in the form of a disc 18' so as to form, with the toothed wheel 13, two parallel circular surfaces between which the rocker bar 29 is retained and slides when absorbing shocks. The height of the rocker bar is slightly less than the distance between the wheel 13 and the disc 18'.

It is to be noted that in a dial measuring instrument provided with a spring for taking up play in the meshing of the gear train of the transmission mechanism in which a force is set up which is always opposed to the displacement of the movable feeler, as for example in certain dial comparators, the transmission mechanism can be advantageously provided with a shock absorbing device as shown in FIG. 3. In such a case, adjustment of the orientation of the rectilinear bearing end 28 of the spiral spring 26 is unnecessary. This is because of the direction in which the balance lever 20 is always maintained pressed against the finger 19. In such a case, it is sufficient to ensure contact of the finger 24 with the balance lever 20, by the pressure of the spring. A certain amount of play between the end 28 of the spiral spring and the finger 19 integral with the pinion 14 can even be tolerated.

A further embodiment of a shock-absorbing device is shown in FIGS. 6 and 7 in which like reference numbers designate same parts shown in FIGS. 1 to 5.

In this embodiment, an arm 34 is fixedly mounted on the shaft 15 and carries, at one of its ends, a radial driving finger. As shown, this finger is a member which is bent upwardly with respect to the end of the arm 34 so as to form a tongue 33. The toothed wheel 13, mounted on the axle 15 in the manner as described with reference to FIG. 2, also carries a radial driving finger 36 which is pressed out and folded downwardly from the wheel 13 to form a tongue. These two fingers 35 and 36 are equidistantly spaced apart from the axle 15. Between the arm 34 of the pinion 14 and the toothed wheel 13, a balance lever 37 is freely rotatably mounted on the axle 15. In its central region, the lever 37 carries two hollow cylindrical hubs 38 and 39, one hub being above, and the other being below, the arm. Each hub has a slot 40, 41 respectively formed therein. The balance lever 37 terminates in a radial direction in two similar flat bearing members 42 and 43 which diametrically opposed to one another about the axis of rotation 15. Each member intercepts one of the two driving fingers 35 and 36.

A first spiral spring 44, located between the balance lever 37 and the toothed wheel 13, is connected at one of its ends to the balance lever or tipping means 37 by a folded portion which engages in the slot 40, and is connected at its other outer end 45, which also has a folded portion, to the driving finger 36 of the toothed wheel 13. A second spiral spring 46, housed between the balance lever 37 and the arm 34 is connected at its inner end to the balance lever 37 by a folded portion which engages in the slot 41 and its other outer end 47, also folded, is connected to the driving finger 35. To achieve the same damping, the tensile force of each of these two spiral springs 44 and 46 is substantially equal to the force of the spiral spring 26 in embodiments shown in FIGS. 2 and 3. These spring forces elastically press the two driving fingers 35 and 36 against the balance lever 37 at two diametrically opposed positions.

The operation of this embodiment of the device is similar to that of the previously described embodiments. However, the damping path is substantially 180° in an extreme case and each driving finger is individually pressed on the balance lever by its own spiral spring. Due to this latter provision, the indexing quality of the angular connection between the pinion 14 and the toothed wheel 13 is automatically ensured. The arrangements described hereinbefore provide an advantage of prior art devices of damping sudden accelerations or decelerations in either of the two directions of displacement of the movable feeler of the dial measuring instruments. Moreover, the damping path is longer than in known device. Moreover, the device of the present invention does not entail precise adjustments and ensures good indexing of the transmission of movement between the movable feeler and the pointer.

Other construction variations, which are not shown, can be made to the device of the present invention.

Thus, the cylindrical driving fingers 19 and 24 shown in FIGS. 2 to 5 could be in the form of tongues, like the fingers 35 and 36 shown in FIGS. 6 and 7. This increases the internal radial space in the device which means that the number of turns in the spiral spring 26 could be increased, if necessary. Similarly, the tongues 35 and 36 in FIGS. 6 and 7 could be in the form of cylindrical fingers 19 and 24 shown in FIGS. 2 to 5.

The re-entrant fold in the form of an arc of a circle given to the end 28 of the spiral spring 26 in the embodiment shown in FIG. 4 could be shaped as a re-entrant angled portion, each inner face of the arms forming the re-entrant angle bearing on one of the two fingers 19 and 24. The arc could also, if desired form part of an ellipsoid or any other suitable geometric curve in dependence upon the distribution effect sought.

The compensation bar 29 shown in FIG. 5, could be differently arranged and could be pivoted, for example, around an axis of rotation which traverses the end 28 of the spiral spring, flattened for enlargement.

Finally, the device described could be employed not only in dial measuring instruments comprising a system having play take-up springs in the gear train of their transmission multiplier mechanisms but also in those which do not have such a system. The device could be disposed in their multiplier mechanisms in other transmission regions than between the first pinion and the coaxial toothed wheel.

What we claim is:

1. An anti-shock device for dial measuring instruments having a gear wheel transmission step-up mechanism arranged between a feeler and a movable indicator member, said step-up mechanism having a first rotating toothed element and a second rotating toothed element coaxial to said first toothed element, comprising:
   a. an arm rigidly connected to said first toothed element;
   b. a first radial drive finger mounted on said arm;
   c. a second radial drive finger mounted on said second toothed element, said second drive finger arranged at a certain distance apart from said first drive finger;
   d. a tipping means interposed between said first and second toothed elements, said tipping means pivotally mounted on the common axis of said first and second toothed elements for intercepting by pivotal movement in a same direction said first and second drive fingers; and
   e. at least a spiral spring means for urging said first and second drive fingers against said tipping means, said spiral spring means having its inner end connected to said tipping means.

2. An anti-shock device according to claim 1, wherein said first and second drive fingers are arranged at a certain radial distance apart from one another, and wherein the outer end of said spiral spring means bears on both said drive fingers, whereby said first and second drive fingers are urged side by side against said tipping means.

3. An anti-shock device according to claim 2, wherein the outer end of said spiral spring means is in the form of a re-entrant fold, and wherein the inner face of said fold bears against and grips said first and second drive fingers.

4. An anti-shock device according to claim 2, further comprising a rocker bar means pivotally mounted on the outer end of said spiral spring means for bearing against said first and second drive fingers.

5. An anti-shock device according to claim 4, wherein said rocker bar means comprises a substantially U-shaped profile and an inner tongue formed between the legs of said U-shaped profile, and wherein the outer end of said spiral spring means is located between said legs and around said tongue.

6. An anti-shock device according to claim 1, comprising first and second spiral spring means for urging said first and second drive fingers against said tipping means, said first and second spiral spring means having their inner ends respectively connected to said tipping means and their outer ends respectively bearing each against one of said first and second drive fingers, wherein said first and second drive fingers are equidistantly spaced apart from the pivotal axis of said tipping means, whereby said first and second spiral spring means urge said first and second drive fingers against said tipping means at 180° with respect to one another.

7. An anti-shock device according to claim 1, wherein each said first and second drive fingers is formed of a tongue bent from the element on which it is carried.